(12) United States Patent
Seigler et al.

(10) Patent No.: US 7,929,249 B2
(45) Date of Patent: Apr. 19, 2011

(54) SPRING LOADED HEAD FOR REDUCED FLY HEIGHT AND TRACKING CONTROL

(75) Inventors: Michael Allen Seigler, Pittsburgh, PA (US); Robert Earl Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1022 days.

(21) Appl. No.: 11/729,068

(22) Filed: Mar. 28, 2007

(65) Prior Publication Data

US 2008/0239579 A1  Oct. 2, 2008

(51) Int. Cl.
*G11B 5/55* (2006.01)
(52) U.S. Cl. .................................... 360/234.7
(58) Field of Classification Search ............... 360/234.7, 360/235.7, 294.1, 294.3, 294.4
See application file for complete search history.

(56) References Cited

U.S. PATENT DOCUMENTS

| | | |
|---|---|---|
| 4,605,977 A | 8/1986 | Matthews |
| 4,669,011 A | 5/1987 | Lemke |
| 4,998,174 A | 3/1991 | Wada et al. |
| 5,124,879 A | 6/1992 | Goto |
| 5,223,998 A | 6/1993 | Tokuyama et al. |
| 5,943,189 A | 8/1999 | Boutaghou et al. |
| 5,959,808 A | 9/1999 | Fan et al. |
| 5,991,113 A | 11/1999 | Meyer et al. |
| 6,249,402 B1 * | 6/2001 | Katayama .................. 360/234.7 |
| 6,362,542 B1 | 3/2002 | Novotny |
| 6,473,259 B1 | 10/2002 | Kuo et al. |
| 6,501,606 B2 | 12/2002 | Boutaghou et al. |
| 6,538,836 B1 | 3/2003 | Dunfield et al. |
| 6,545,846 B1 | 4/2003 | Chee et al. |
| 6,570,730 B1 | 5/2003 | Lewis et al. |
| 6,580,687 B1 | 6/2003 | Cumpson et al. |
| 6,611,399 B1 | 8/2003 | Mei et al. |
| 6,690,543 B2 | 2/2004 | Kurita et al. |
| 6,731,471 B1 | 5/2004 | Bonin |
| 6,775,089 B1 | 8/2004 | Bonin et al. |
| 6,785,086 B1 | 8/2004 | Bonin et al. |
| 6,798,605 B2 | 9/2004 | Kurita et al. |
| 6,958,889 B2 | 10/2005 | Schnur et al. |
| 6,967,806 B2 | 11/2005 | Rao et al. |
| 7,064,933 B2 | 6/2006 | Macken et al. |
| 7,068,457 B2 | 6/2006 | Riddering et al. |
| 7,092,193 B1 | 8/2006 | McKenzie et al. |
| 7,126,792 B2 | 10/2006 | Bonin et al. |
| 7,209,309 B2 * | 4/2007 | Kurita et al. .................. 360/75 |
| 7,336,443 B2 * | 2/2008 | Bonin ........................ 360/234.7 |
| 2001/0030822 A1 | 10/2001 | Boutaghou et al. |

* cited by examiner

*Primary Examiner* — Angel A. Castro
(74) *Attorney, Agent, or Firm* — Robert P. Lenart, Esq.; Pietragallo Gordon Alfano Bosick & Raspanti, LLP

(57) ABSTRACT

An apparatus includes a body having a first air bearing surface and defining an opening, and a transducer portion having a second air bearing surface and positioned within the opening and coupled to the body by a plurality of spring members extending from the transducer portion to the body.

9 Claims, 5 Drawing Sheets

US 7,929,249 B2

SPRING LOADED HEAD FOR REDUCED FLY HEIGHT AND TRACKING CONTROL

FIELD OF THE INVENTION

This invention relates to data storage devices and, more particularly, to an apparatus carrying a transducing head for use in data storage devices.

BACKGROUND OF THE INVENTION

Air bearing sliders have been extensively used in disc drives to appropriately position a transducing head above a rotating disc. During operation the disc rotates at high speeds, which produces air movement and generates a lift force directing the slider away from the disc and against a load beam causing the slider to fly at an ultra-low height above the disc. The gap between the slider and the disc forms an air bearing. For the transducing head to read and write accurately, a specified head-to-media spacing (HMS), or air bearing gap, must be maintained between the transducing head pole tip and the disc.

As disc storage systems are designed for greater and greater storage capacities, the density of concentric data tracks on a disc is increasing (that is, the size of data tracks and radial spacing between data tracks is decreasing). The higher data storage (or recording) density requires the HMS between each transducing head and the rotating disc be reduced. As the desired HMS decreases, the amount of allowable HMS modulation decreases as well.

The non-flat surface topography of the disc can cause a disturbance or vibration of the air bearing gap of the slider. This disturbance can cause the air bearing gap of the slider to modulate, thereby resulting in HMS modulation. When the air bearing gap modulates, the transducing head cannot accurately read or write to and from the disc.

Maintaining the HMS substantially constant between the transducing head and the disc permits the transducing head to read and write data accurately. Heaters have been used in sliders to adjust the position of transducers through thermal expansion of heated components. Other approaches use microactuators to control the position of the slider.

There is a need for a slider that is capable of maintaining the HMS substantially constant and minimizing the HMS modulation, and is less complex than other active fly height control and high frequency tracking concepts. In addition, for direct contact during recording, it would be desirable to reduce the mass of the recording head that is in contact with the storage media, which would reduce wear of the media.

SUMMARY OF THE INVENTION

In a first aspect, this invention provides an apparatus including a body having a first air bearing surface and defining an opening, and a transducer portion having a second air bearing surface and positioned within the opening. The transducer portion is coupled to the body by a plurality of spring members extending from the transducer portion to the body.

An actuator can be included for moving the transducer portion with respect to the body. The actuator can be positioned between the body and an end of the transducer portion opposite the second air bearing surface, and/or between the body and a side of the transducer portion. The actuator can include tracking control electrodes on opposite sides of the transducer portion.

In another aspect, the invention provides a method including positioning a body having a first air bearing surface and a transducer portion having a second air bearing surface adjacent to a data storage medium, wherein the transducer portion is coupled to the body by an actuator, and controlling the actuator to adjust the position of the transducer portion with respect to the data storage medium during reading and/or writing. The actuator can be controlled to adjust tracking, fly height, and/or stability of the transducer portion.

In another aspect, the invention provides a method including positioning a body having a first air bearing surface and a transducer portion having a second air bearing surface adjacent to a data storage medium, moving the transducer portion into contact with the data storage medium during reading and/or writing, and moving the transducer portion away from the data storage medium when reading and/or writing is not performed.

The transducer portion can be coupled to the body by a plurality of spring members extending from the transducer portion to the body. The movement of the transducer can be effected using an actuator that moves the transducer portion with respect to the body. The actuator can produce a signal representative of the position of the transducer portion with respect to the body.

DETAILED DESCRIPTION OF THE INVENTION

Figure 1:
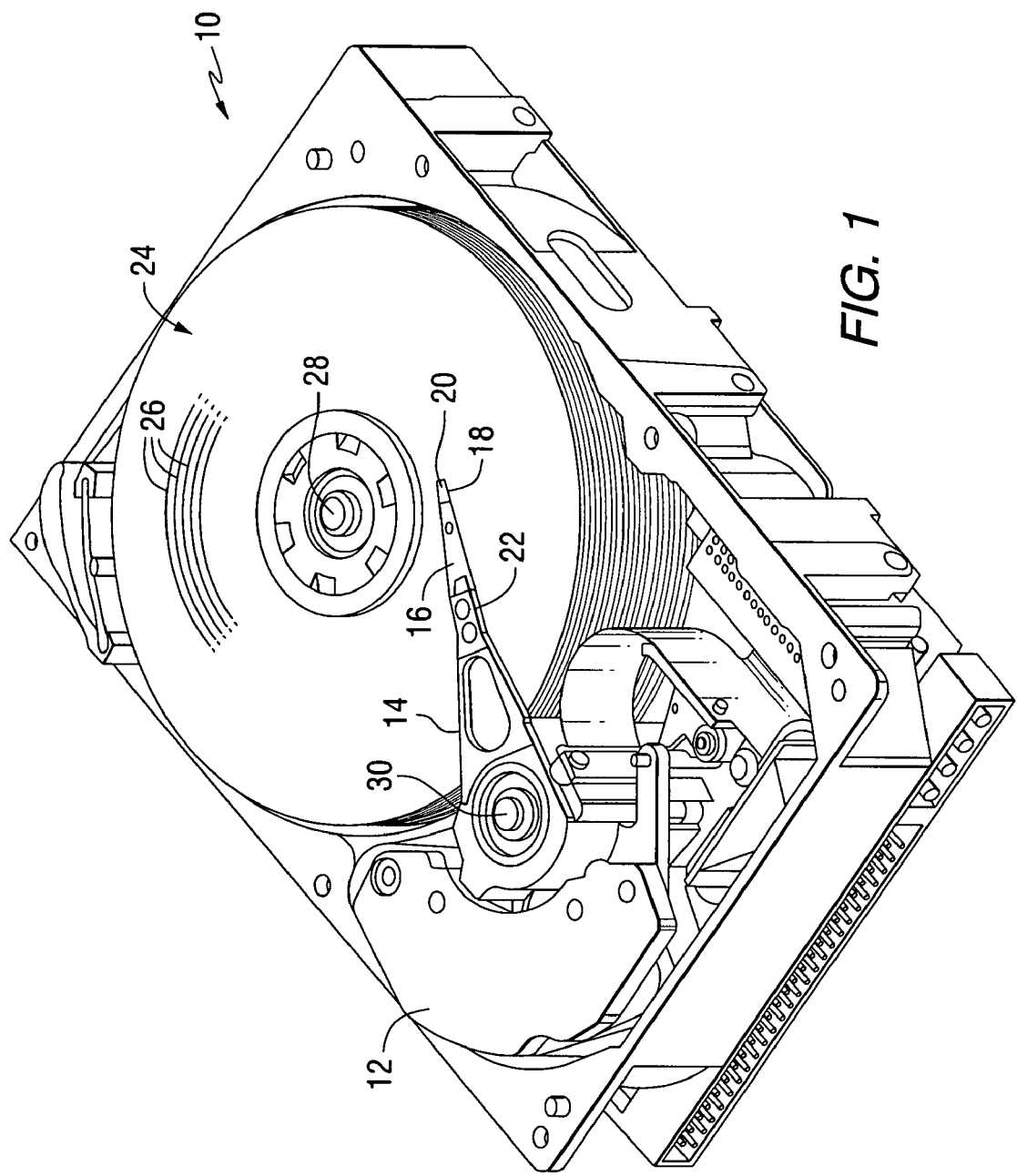
FIG. 1 is a pictorial representation of a storage device in the form of a disc drive that can include structures constructed in accordance with an aspect of the invention.

FIG. 1 is a top perspective view of a data storage device in the form of a disc drive 10 that includes components for positioning a transducing head over a track of a disc. The disc drive 10 includes a voice coil motor (VCM) 12, an actuator arm 14, a suspension 16, a flexure 18, and a slider 20. Slider 20 is connected to the distal end of suspension 16 by flexure 18. Suspension 16 is connected to actuator arm 14 at a head mounting block 22, while actuator arm 14 is coupled to VCM 12. As shown in FIG. 1, the disc drive assembly includes a plurality of discs 24, each having a multiplicity of tracks 26, which rotates about an axis 28. During operation of the disc drive assembly, rotation of the discs 24 generates air movement, which is encountered by slider 20. This air movement acts to keep slider 20 aloft a small distance above the surface of the discs 24 allowing the slider to fly above the surface of the discs 24. VCM 12 is selectively operated to move actuator arm 14 around an axis 30, thereby moving suspension 16 and positioning a transducing head carried by slider 20 adjacent to the tracks 26 of the discs 24. Proper positioning of the transducing head is necessary for reading and writing data on the concentric tracks 26 of the discs 24.

In one aspect, this invention provides an apparatus, or slider, having a body and a low mass portion, which can include recording and/or reading elements. The low mass portion is coupled to the body of the slider using a plurality of micro-electromechanical system (MEMS) springs. Actuators can be included to control the fly height and/or tracking of the low mass portion. The low mass portion is referred to as the "head-chip" in this description.

Figure 2:
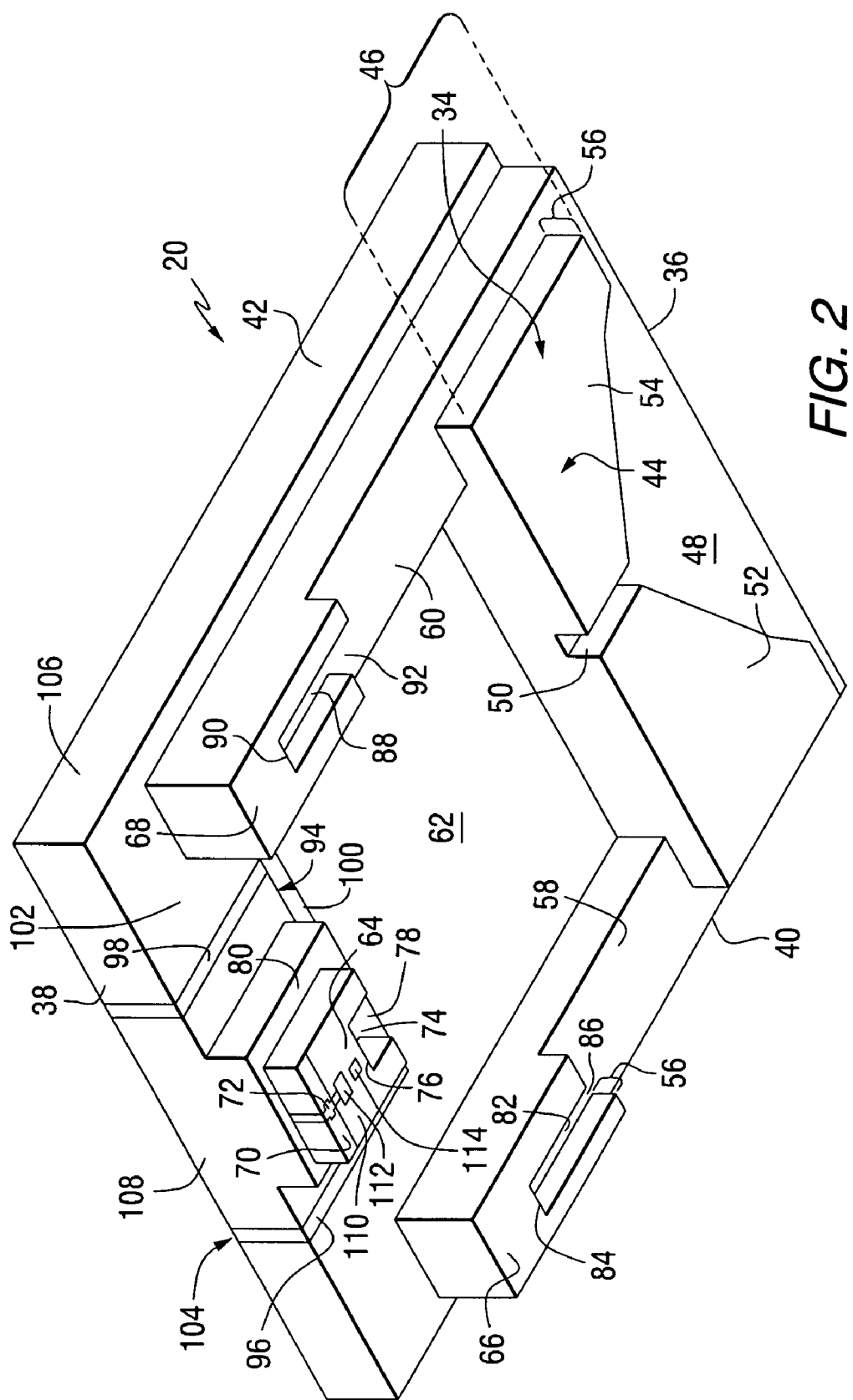
FIG. 2 is an isometric view of a slider that includes a microactuator.
Figure 3:
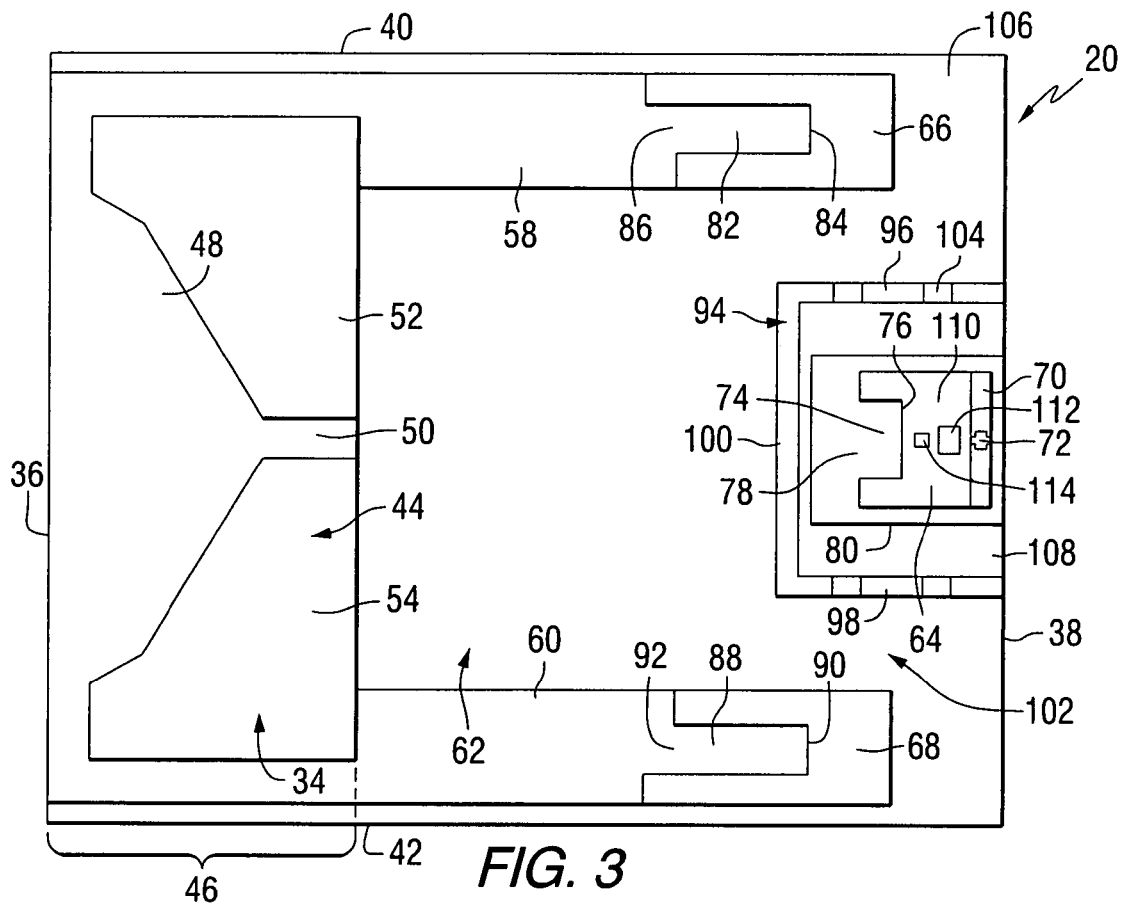
FIG. 3 is a plan view of the air bearing side of the slider of FIG. 2.

FIG. 2 is a bottom isometric view of an example of the slider 20 and FIG. 3 is a bottom view of the slider 20. Slider 20 has a disc opposing face 34 bounded by a leading edge 36, a trailing edge 38, a first side edge 40, and a second side edge 42. Leading edge 36 and trailing edge 38 are substantially parallel to each other, and two side edges 40 and 42 are substantially parallel to each other. Other configurations are possible for the slider body, including trapezoidal shapes. During operation, the disc opposing face 34 is positioned adjacent to the disc 24 of FIG. 1.

The contour of the disc opposing face 34 of air bearing slider 20 has a significant effect on the flying characteristics of air bearing slider 20, and various contours have been proposed and used for air bearing sliders. The slider must maintain adequate roll pitch and stiffness over a range of operating speeds and over a predetermined range of skew angles. The slider must also maintain an ultra-low fly height over the disc 24 while the disc drive is in operation. While slider 20 is flying over disc 24 during operation, the head-to-media spacing (HMS) between the transducing head and the disc must be maintained substantially constant to accurately read and write data to and from the disc.

The disc opposing face 34 of the slider 20 defines an air bearing surface 44. The air bearing surface 44 can serve as a reference surface for slider 20, or slider body. A cross rail 46 is positioned behind leading edge 36 and extends from first side edge 40 to second side edge 42. Cross rail 46 has a front portion 48, a channel 50, and first and second rear portions 52 and 54, respectively. The first rear portion 52 is located adjacent to the first side edge 40 and the second rear portion 54 is located adjacent to the second side edge 42. Surfaces of the rear portions 52 and 54 can be coincident with air bearing surface 44, however, in this example the front portion 48 and channel 50 of cross rail 46 are recessed from air bearing surface 44 at a step depth 56.

A first side rail 58 is positioned adjacent to the first side edge 40 and a second side rail 60 is positioned adjacent to the second side edge 42. Side rails 58 and 60 extend from the cross rail 46 and towards trailing edge 38. The first side rail 58 and second side rail 60 are disposed substantially parallel to each other. Side rails 58 and 60 are recessed from the air bearing surface 44 at a step depth 56. The step depth 56 can be, for example, between about 0.1 microns and about 1 micron. Other examples of the slider 20 may have side walls or other components with surfaces at the air bearing surface 44.

A cavity 62 is positioned on the disc opposing face 34. The cavity 62 is recessed from the air bearing surface 44 at a cavity depth. The cavity depth can be, for example, between about 1.0 microns to about 4.0 microns. The first side rail 58 has an inner face facing cavity 62, and the second side rail 60 has an inner face facing cavity 62. The cavity 62 is bounded by the cross rail 46, the inner face of first side rail 58, and the inner face of second side rail 60.

A center pad 64 is positioned proximate to the trailing edge 38, and a first side pad 66 and a second side pad 68 are positioned proximate to the first and second side rails 58 and 60, respectively. Each pad has a surface at the air bearing surface 44. The center pad 64 is positioned substantially along the longitudinal axis of slider 20. A transducing head 70 is located on the center pad 64 and positioned substantially along the longitudinal axis of slider 20 and adjacent trailing edge 38. A pole tip 72 of the transducing head 70 is located adjacent to the air bearing surface 44 approximately where the longitudinal axis of slider 20 intersects trailing edge 38. A first side pad 66 can be located forward of the trailing edge 38 and adjacent to the first side edge 40. The first side pad 66 is connected to the first side rail 58. A second side pad 68 is located forward of trailing edge 38 and adjacent to the second side edge 42. The second side pad 68 is connected to the second side rail 60.

A center trench 74, at a step depth 56, is positioned within the center pad 64. The center trench 74 has a back wall 76 formed by the center pad 64, and an inlet 78. The inlet 78 lies closer to the leading edge 36 than the back wall 76, and the inlet 78 is substantially parallel to the leading edge 36. An outer perimeter 80, at a step depth 56, surrounds the center pad 64 and intersects the center trench 74 at the inlet 78.

A first side trench 82, at a step depth 56, extends into the first side pad 66. The first side trench 82 has a back wall 84 formed by the first side pad 66, and an inlet 86. A second side trench 88, at a step depth 56, extends into the second side pad 68. The second side trench 88 has a back wall 90 formed by the second side pad 68, and an inlet 92. Inlets 86 and 92 lie closer to the leading edge 36 than the back walls 84 and 90. The inlets 86 and 92 are disposed substantially parallel to the leading edge 36.

Although slider 20 of FIG. 3 has a detailed disc opposing face 34 including center trench 74, and side pads and side trenches, additional examples of the slider 20 may include none or only some of these features. Furthermore, in additional examples of the slider 20 the center pad 64 can be recessed from the air bearing surface 44 at step depth 56.

In this example, a gap 94 is positioned along three sides of the center pad 64. The gap 94 also extends in a direction substantially perpendicular to the disc opposing face 34 of the slider 20. The gap 94 can have a height equal to the depth of the cavity 62. In the example of FIG. 3, the gap 94 has a first section 96 and a second section 98 substantially parallel to first section 96. A central section 100 connects the first and second sections 96 and 98. The first and second sections 96 and 98 extend to the trailing edge 38. Although center pad 64 of the example of FIGS. 2 and 3 is square shape, other shapes are possible for the center pad, such as semi-circular, trapezoidal, or pentagonal. In addition, gap 94 may have other shapes as well. Furthermore, in other examples of slider 20 the gap 94 may be located adjacent to the center pad 64 and can substantially surround transducing head 70.

A suspension assembly 104 is positioned in the gap 94. The slider body can be made of AlTiC, although other materials can be used. In one example, the suspension assembly 104 includes a plurality of springs extending between the slider body 20 and the center pad 64. The example of FIGS. 2 and 3 includes a slider body structure 106 and a transducer portion 108 coupled to each other by the suspension assembly 104. This arrangement forms a primary air bearing between surface 102 and the storage medium, and a secondary air bearing between surface 110 and the storage medium. The transducer portion can include components typically found in a recording head, including a write pole and a read sensor. In one example, the transducing head 70 includes a pole tip 72 and a return pole 112. The pole tip and the return pole can be coupled by a pedestal as is known in the art. A coil can encircle the pedestal. A current in the coil induces a magnetic field in the pedestal and the poles. Magnetic flux exits the recording head at the air bearing surface and is used to change the magnetization of portions of a magnetically hard layer of the storage medium. For a perpendicular recording head, a storage medium having a soft underlayer may be used.

The transducing head can further include a sensor 114 that senses magnetic fields produced by magnetic domains in the storage medium. The sensor can be, for example, a magnetoresistive device. The transducer portion is mounted on the pad 64 and coupled to the body using the suspension assembly 104. An electrostatic actuator can be included to move the transducer portion with respect to the slider body structure.

While the slider 20 is flying over the surface of the disc, various factors, such as mechanical shock and variations in the airflow, can cause the slider 20 to contact the disc or to not maintain a steady flying height. Additionally, variations in the surface topography of the disc 24 can have a significant effect on modulation of the HMS.

As the slider 20 flies over the surface of disc 24, a specified HMS must be maintained between the air bearing surface 110 of the transducing head 70 and the disc 24. As recording density increases, that is the density of concentric data tracks 26 on disc 24 increases, the desired HMS decreases along with the allowable HMS modulation as the slider 20 flies above the disc 24. Variations in the HMS can cause the transducing head 70 to inaccurately read and write data to and from the disc 24. In some cases the transducing head can contact the disc.

In one aspect of the invention, the suspension assembly 104 maintains the HMS substantially constant as the slider 20 flies above the disc 24. The suspension assembly 104 allows the center pad 64 and the transducing head 70 to move with respect to the slider body. As the slider 20 flies above the disc 24, the slider 20 responds to the global topography of disc 24 and the transducing head 70 can respond to the local surface topography of the disc directly underneath the transducing head 70. The transducing head 70 can be displaced vertically from the mean fly height of the slider 20 in response to the local disc surface topography directly below the transducing head 70. The suspension assembly 104 allows the transducing head 70 to follow the local topography of the disc 24 beneath it, while the rest of the slider 20 follows the global topography of disc 24. The transducing head 70 follows the local disc surface topography and vertical movement of the center pad 64 maintains the HMS substantially constant.

The secondary air bearing surface 110 of the transducer portion, the storage medium, and a gap between them, form the secondary air bearing. The secondary air bearing is distinct from the primary air bearing formed between the rest of the slider 20 and the storage medium. The suspension assembly 104 allows the secondary air bearing surface 110 to move with respect to the slider body structure and to follow the local topography of the disc 24 beneath the transducing head 70 while the rest of the slider 20 follows the global topography of the disc 24.

The stiffness of the suspension assembly 104 can be chosen to reduce or eliminate specific frequency components of the pole tip 72 or the transducing head 70 that degrade the ability of the transducing head to follow the disc surface topography, and thereby minimize HMS modulation caused by a variety of sources, such as microwaviness and servo patterned media (SPM), and the trailing edge (TE) pitch mode. The trailing edge pitch mode is the natural resonant frequency of the slider, wherein the slider vibrates around an axis located at leading edge 36, and perpendicular to the slider's longitudinal axis, with an angular motion, or rotation. The waviness or pits on the surface of the disc can occur at certain frequencies. The disc surface topography can excite one of the resonant frequencies of the air bearing, such as TE pitch, leading edge (LE) pitch or roll. Thus, different discs cause different frequency responses in the transducing head. The elimination of specific frequencies, for example caused by microwaviness, SPM, or TE pitch mode, may require a certain stiffness in the suspension assembly 104. Thus, the stiffness of the suspension assembly 104 can be chosen for a specific frequency response to reduce or eliminate certain frequency components.

Figure 4:
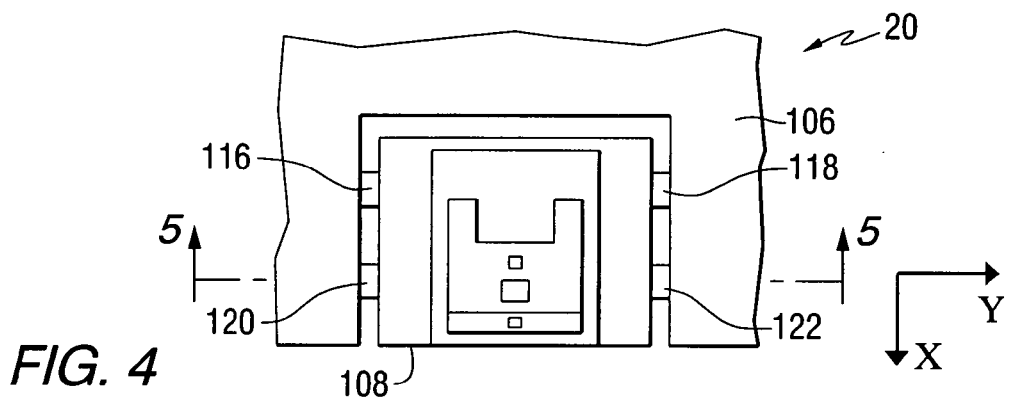
FIG. 4 is a plan view of the air bearing side of another apparatus constructed in accordance with an aspect of the invention.
Figure 5:
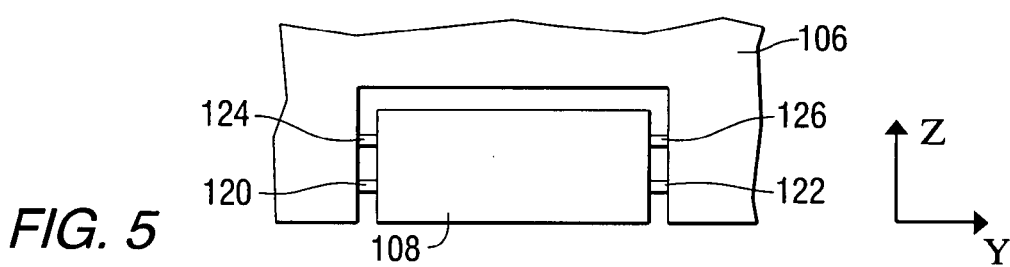
FIG. 5 is a cross-sectional view of a portion of the apparatus of FIG. 4 taken along line 5-5.

FIG. 4 is a plan view of the air bearing surface of a portion of a slider 20 that includes a body structure 106 and a transducer portion 108 coupled to each other by a suspension assembly 104. FIG. 5 is a cross-sectional view of the slider of FIG. 4 taken along line 5-5. In this example, the suspension comprises a plurality of spring members 116, 118, 120, 122, 124, and 126. Each of the spring members extends between the body structure 106 and the transducer portion 108. The spring members can have, for example, a rectangular or trapezoidal cross-sectional shape.

The spring members can be thicker in the X-direction (i.e., the down track direction) than in the Z-direction (i.e., perpendicular to the ABS) to provide stability in the down track direction. For fly height control only, the spring members can also be thicker in the Y-direction (i.e., the cross track direction) relative to the thickness perpendicular to the ABS. This would allow the transducer portion to move vertically more easily.

If tracking control is to be added, the springs can be positioned on top and in back of the transducer portion, and also be thinner in the cross track direction. This would allow the transducer portion to move side-to-side more easily. In order to have tracking control, the springs can have some built-in bends (e.g., a serpentine or zigzag), so they can give support in the vertical and down track directions but still allow movement in the cross track direction.

In the example of FIGS. 4 and 5, spring members 124 and 126 are positioned above spring members 120 and 122 respectively. Additional spring members can be positioned above spring members 116 and 118. In other examples, more or fewer spring members can be used.

Figure 6:
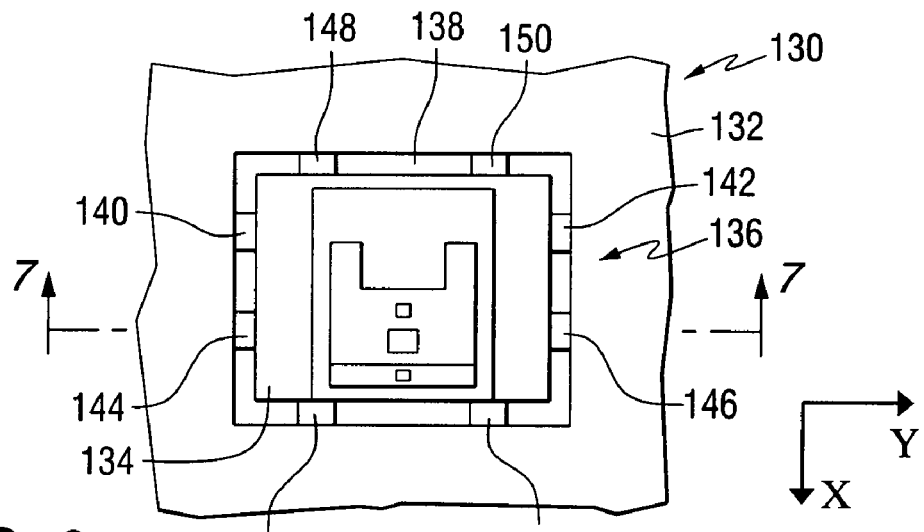
FIG. 6 is a plan view of the air bearing side of another apparatus constructed in accordance with an aspect of the invention.
Figure 7:
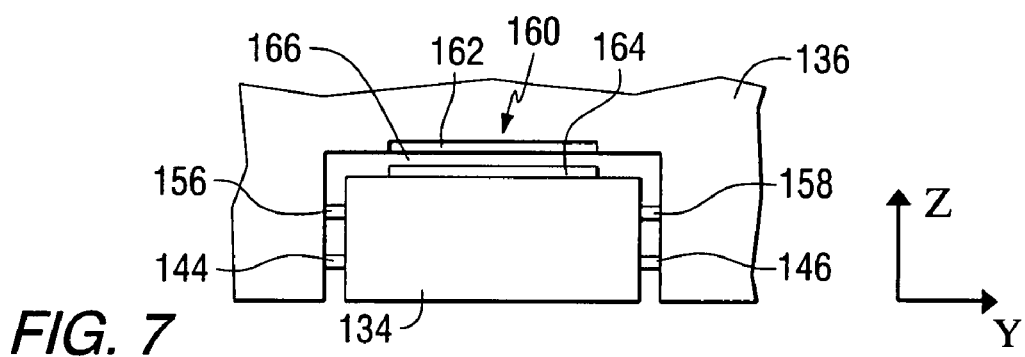
FIG. 7 is a cross-sectional view of a portion of the apparatus of FIG. 6 taken along line 7-7.

FIG. 6 is a plan view of the air bearing surface of a portion of another slider 130 that includes a body structure 132 and a transducer portion 134 coupled to each other by a suspension assembly 136. FIG. 7 is a cross-sectional view of the slider of FIG. 4 taken along line 7-7. The body structure includes an opening 138 and at least a portion of the transducer portion is positioned within the opening. In this example, the opening encompasses the entire perimeter of the transducer portion. The suspension comprises a plurality of spring members 140, 142, 144, 146, 148, 150, 152 and 154. Each of the spring members extends between the body structure 132 and the transducer portion 134. The spring members can have a rectangular or trapezoidal cross-sectional shape. In this example, spring members 156 and 158 are positioned above spring members 144 and 146 respectively. Additional spring members can be positioned above the other spring members. In other examples, more or fewer spring members can be used.

Fly height control can be achieved using electrodes on the sides or back of the transducer portion to electrostatically control the fly height of the transducer portion with respect to the slider and, thus, with respect to the media.

One or more actuators can be included to move the transducer portion with respect to the body structure. In FIG. 7, an actuator 160 is positioned between the transducer portion 134 and the body structure 136. The transducer includes first and second electrodes 162 and 164 separated by a gap 166. A voltage can be applied to the electrodes to create an electrostatic force between the electrodes to move the transducer portion in the Z-direction with respect to the structure body. One or more of the spring members can be electrically conductive and connected to the electrode 164, and a voltage can be applied to electrode 164 through the spring member.

Figure 8:
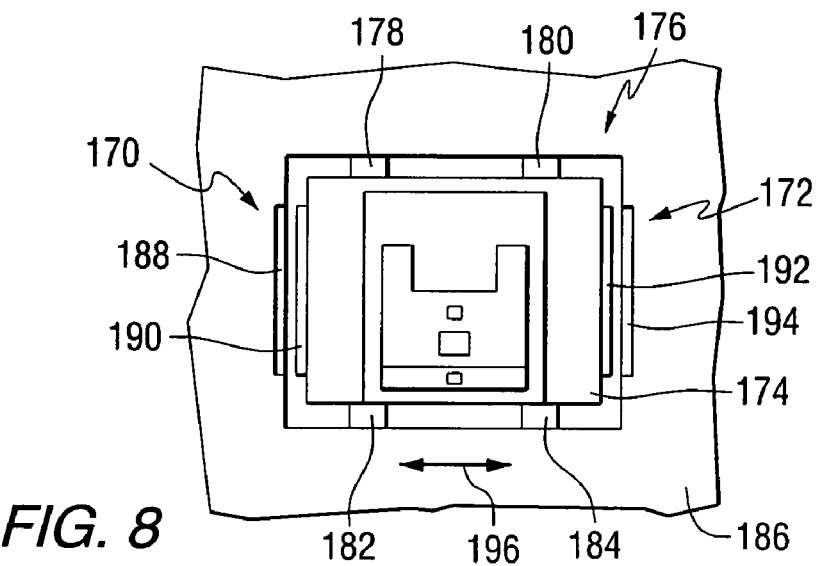
FIG. 8 is a plan view of the air bearing side of another apparatus constructed in accordance with an aspect of the invention.

Tracking can be achieved using electrodes on the sides or back of the head-chip to electrostatically control the lateral position of the head-chip with respect to the slider. To provide cross track movement of the transducer portion, an actuator can be positioned between a side of the transducer portion and the structure body. FIG. 8 is a plan view of the air bearing side of a slider that includes actuators 170 and 172 on opposite sides of a transducer portion 174. A suspension 176 comprising spring members 178, 180, 182 and 184 couples the transducer portion to a body structure 186. Actuator 170 comprises electrodes 188 and 190. Actuator 172 comprises electrodes 192 and 194. The actuators can move the transducer portion in the cross track direction as indicated by arrow 196.

In other examples, the electrodes that form an electrostatic actuator can have interlaced fingers to increase the electrostatic force between the electrodes for a given applied voltage. Alternatively, an electromagnetic actuator could be used, wherein an electromagnet can be positioned on the structure body and a magnet or ferromagnetic material can be positioned on the transducer portion. In another example, the electromagnet could be positioned on the transducer portion.

Springs can be positioned on multiple sides of the low mass portion of the slider. In one example, the springs are connected to five sides of the low mass portion. Actuators can be added to control the position of the low mass portion relative to a surface of a storage media.

The suspension assemblies of this invention can be combined with a compliant material, if the compliant material is very compliant (e.g., as with air). With the springs on more than one side, and the potential for active control on more than one side, the invention provides multiple options for designing the resonant and active control structure.

Another way to make the actuators is to make the spring members out of a piezoelectric material such as PZT and to put electrodes on either side of the spring. A voltage could then be applied to the PZT to actuate the head. Another approach is to add a piezoelectric material connecting the slider to the transducer portion in addition to the spring.

Figure 9:
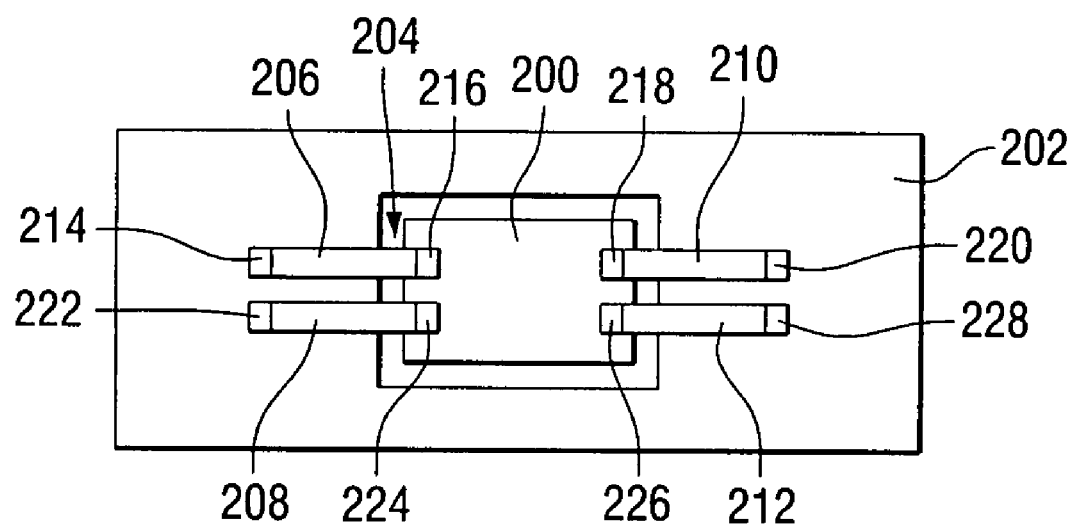
FIG. 9 is a plan view of the air bearing side of another apparatus constructed in accordance with an aspect of the invention.
Figure 10:
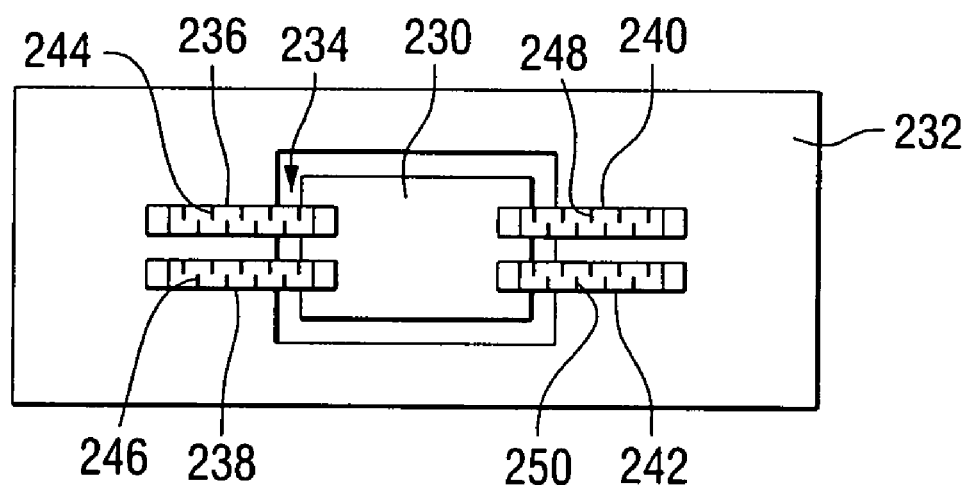
FIG. 10 is a plan view of the air bearing side of another apparatus constructed in accordance with an aspect of the invention.

FIGS. 9 and 10 show examples where the springs could be a piezoelectric material. FIG. 9 is an ABS view of an apparatus including a transducer portion 200 coupled to a body 202 by a suspension 204 including a plurality of springs 206, 208, 210 and 212 of piezoelectric material. Electrodes 214, 216, 218, 220, 222, 224, 226 and 228 are positioned at the ends of the springs. A voltage can be applied across each of the springs to cause piezoelectric deformation of the springs, which will move the transducer portion with respect to the body. In FIG. 9 electrodes are positioned on the outer edges of the springs.

FIG. 10 is an ABS view of an apparatus including a transducer portion 230 coupled to a body 232 by a suspension 234 including a plurality of springs 236, 238, 240 and 242 of piezoelectric material. Electrodes 244, 246, 248 and 250 are interdigitated and mounted on the piezoelectric spring material. A voltage can be applied to the electrodes to cause piezoelectric deformation of the springs, which will move the transducer portion with respect to the body. The examples of FIGS. 9 and 10 can be operated in a push-pull fashion for tracking control. In push-pull operation, the two springs on one side would be pushing the head-chip and the two springs on the other side would be pulling the head-chip. This type of electrode could also be built above the head-chip for fly height control. While the examples of FIGS. 9 and 10 show the low mass portion positioned within a rectangular opening in the body, other opening shapes can be used, or the low mass position can be positioned in a slot in the body, such that the low mass portion is not completely surrounded by the body.

In another example, a magnetic actuator can be formed by wrapping a coil around a soft magnetic material (such as a write head) on the slider or transducer portion and then having a permanent magnet material or a second coil around a soft magnetic material across the trench on the slider or transducer portion.

The springs could also be used for routing electric leads from the slider body to the transducer portion. This could be done by using the springs as the leads if the springs are metal and there are enough of them. This could also be done by running separate leads across the springs and either insulating the leads from the spring or putting the leads directly on the spring. If the springs are wide enough, multiple leads could be put on each spring.

In another aspect, the invention provides a method including positioning a body having a first air bearing surface and a transducer portion having a second air bearing surface adjacent to a data storage medium, wherein the transducer portion is coupled to the body by an actuator, and controlling the actuator to adjust the position of the transducer portion with respect to the data storage medium during reading and/or writing. The actuator can be controlled to adjust tracking, fly height, and/or stability of the transducer portion. The actuator can be used to produce a signal representative of the position of the transducer portion with respect to the body. For example, the capacitance between electrodes on the low mass portion and the body could be used to provide an indication of the relative position between the low mass portion and the body. Alternatively, sensors, such as magnetoresistive sensors, could be mounted on either the low mass portion or the body in combination with magnetic material on the other part.

In another aspect, the invention can be used in a data storage system that performs contact recording. For contact recording, the head-chip can have a much smaller mass than the mass of the slider, with dimensions of, for example, ~50 μm×~50 μm×~10 μm. The spring constant of the springs in the spring assembly could be designed to exert a desired pressure on the media. An electrostatic actuator could also be used to bring the head-chip into contact with the media and to adjust the pressure on the media. In another aspect, the fly height actuator could also be used to keep the head-chip in contact with the storage media only during reading and writing processes and then pull it up off the media during other times, in order to prevent unnecessary wear.

In the contact recording aspect, the invention provides a method including positioning a body having a first air bearing surface and a transducer portion having a second air bearing surface adjacent to a data storage medium, moving the transducer portion into contact with the data storage medium during reading and/or writing, and moving the transducer portion away from the data storage medium when reading and/or writing is not performed. The transducer portion can be coupled to the body by a plurality of spring members extending from the transducer portion to the body. Movement of the transducer can be effected using an actuator that moves the transducer portion with respect to the body. The actuator can be used to produce a signal representative of the position of the transducer portion with respect to the body.

The transducer portion can be fabricated by starting with a standard AlTiC wafer with an alumina basecoat. A release material that can be selectively etched with respect to alumina can be deposited, along with another material that will be used as the spring. Then alumina can be deposited and chemical mechanical polishing (CMP) can be used to planarize the wafer. An example would be to use Cu as the release material and Ni as the spring material. A second example would be to use an organic material as the release layer, which can be removed by a solvent.

The design (shape, size, location, material) of the springs would be adjusted to achieve the desired transducer portion mechanical response. The springs could be electrodeposited Ni, NiFe, Cu, etc. The springs could be as simple as straight beams, or they could have bends in them to allow for the desired spring constants in each direction.

The springs could be both above and below the transducer portion in the Y and X-directions or even at the same level as the head in the X, Y and Z-directions. There could be different numbers, sizes or locations of the springs connecting the head-chip to the slider body.

A trench in the alumina can be etched out down to the release layer. This etch will define the size of the transducer portion. This could be done with a $CHF_3$ reactive ion beam etch or a selective wet etch, which wouldn't etch the spring material. The trench can be filled with the same or similar release material. If this is an organic material, it could be spun on. If the release material is Cu, it could be electroplated to fill the trench.

A block of the release material can then be patterned over top of the transducer portion. If this is an organic material, this step could be combined with the above step and be just a basic lithography step to fill the trenches and define the release material over the transducer portion in one step. If the release material is Cu, this could be a standard electrodeposition step.

The wafer processing can be finished using known techniques, such as applying an overcoat and connection pads, and then slicing, lapping and dicing. Then the release layer can be etched out. If the release layer is an organic, a simple solvent could be used to do the release. The release can be done with a wet etch or an etch similar to the $XeF_2$ or HF dry etch used in MEMS processing.

The above process is only an example process and there are many modifications that could be made to fabricate the same general structure. One possible modification would be when the release itself is performed. If cutting and lapping a slider that has already been released is not a problem, the release can be done at wafer level. Cutting or lapping of the already released head-chip may be an issue due to the stress put on the head-chip and the possibility of trapping material in the trenches.

The release could also be performed partially at the wafer level. There are multiple ways of doing this, but in general, the release material could be removed from everywhere except near the ABS, or removed from everywhere and more release material added back in the area below and just above the ABS. This would hold the transducer portion stable, keep debris from entering the trenches during slicing and lapping, and it would make the release easier since there would be much less release material to remove.

In addition to the above processes, electrodes can easily be added to the sides or top of the head-chip and the surrounding area on the slider to control the fly height and tracking. These electrodes could be planar or interdigitated finger electrodes. They could be formed when the springs are formed or at a separate step.

While the present invention has been described in terms of several examples, it will be apparent to those skilled in the art that various changes can be made to the disclosed examples without departing from the scope of the invention as defined by the following claims.

What is claimed is:

1. An apparatus comprising:
   a body having a first air bearing surface and defining an opening;
   a transducer portion having a second air bearing surface and positioned within the opening, wherein the transducer portion is coupled to the body by a plurality of spring members extending from the transducer portion to the body; and
   an actuator for moving the transducer portion in a cross-track direction with respect to the body, the actuator comprising first and second electrodes positioned parallel to each other, wherein the first electrode is connected to a first side of the transducer portion lying parallel to a longitudinal axis of the body and the second electrode is connected to the body.

2. The apparatus of claim 1, wherein the actuator is positioned between the body and a side of the transducer portion.

3. The apparatus of claim 2, wherein the actuator comprises:
   tracking control electrodes on opposite sides of the transducer portion.

4. The apparatus of claim 1, wherein the actuator comprises:
   an electromagnetic actuator, an electrostatic actuator, or a piezoelectric actuator.

5. The apparatus of claim 1, wherein the opening encompasses the entire perimeter of the transducer portion.

6. The apparatus of claim 1, wherein the transducer portion comprises:
   a write pole; and
   a sensor element.

7. The apparatus of claim 1, wherein the spring members comprise electrodes for coupling signals to the transducer portion.

8. The apparatus of claim 1, wherein the spring members have a rectangular cross-section and are thinner in the cross-track direction than in a direction perpendicular to the air bearing surface.

9. The apparatus of claim 1, wherein the actuator further comprises:
   third and fourth electrodes positioned parallel to each other, wherein the third electrode is connected to a second side of the transducer portion lying parallel to the longitudinal axis of the body and the fourth electrode is connected to the body.

* * * * *